(12) United States Patent
Tanaka

(10) Patent No.: US 6,901,470 B1
(45) Date of Patent: May 31, 2005

(54) DATA INPUT/OUTPUT SYSTEM

(75) Inventor: Masahiro Tanaka, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 397 days.

(21) Appl. No.: 09/664,542

(22) Filed: Sep. 18, 2000

(30) Foreign Application Priority Data

Feb. 9, 2000 (JP) ........................................ 2000-031746

(51) Int. Cl.$^7$ .............................................. G06F 13/00
(52) U.S. Cl. ............................ 710/305; 710/73; 710/74
(58) Field of Search .............................. 710/69, 73, 74, 710/305; 711/211

(56) References Cited

U.S. PATENT DOCUMENTS

| | | | |
|---|---|---|---|
| 4,201,472 A | * | 5/1980 | Maeda ........................ 356/226 |
| 4,514,822 A | * | 4/1985 | Schneider et al. ............ 702/31 |
| 5,535,349 A | * | 7/1996 | Boaz et al. .................... 711/1 |
| 6,249,833 B1 | * | 6/2001 | Takahashi ................... 710/308 |

FOREIGN PATENT DOCUMENTS

| | | |
|---|---|---|
| EP | 0 554 819 A1 | 8/1993 |
| JP | 5 702 0979 | 2/1982 |
| JP | 6 308 5954 | 4/1988 |
| JP | 6 331 3251 | 12/1988 |
| SU | 1683039 A1 | 10/1991 |

OTHER PUBLICATIONS

European Search Report dated Jan. 12, 2004.

* cited by examiner

*Primary Examiner*—Glenn A. Auve
(74) *Attorney, Agent, or Firm*—Arent Fox PLLC

(57) ABSTRACT

A data I/O system includes first and second function blocks connected to a system bus, which allows the function blocks to communicate with a processor. Each function block includes a D/A converter for outputting an analog signal and a waveform generator that provides a digital signal to the D/A converter. The waveform generator includes a memory control circuit and an address generation circuit. The memory control circuit has an address register and a data register, both of which are connected to the system bus, and a memory connected to the address register and the data register. The address generation circuit is connected to the address register and includes a control register, an up-down counter, and a comparator. The address generation circuit repetitively provides a circulating address signal to the address register. The function blocks relieve the processor of some of its processing load, but do not require additional I/O port addresses of the system.

14 Claims, 15 Drawing Sheets

DATA INPUT/OUTPUT SYSTEM

BACKGROUND OF THE INVENTION

The present invention relates to a data input/output (I/O) system, and, more particularly, to a data I/O system provided with a function block having a memory.

Recently, recording devices such as DVD-ROMs and personal digital assistants (PDAs) having functions that receive and output audio signals are popular. A PDA comprises a microprocessor system as a data I/O system. The microprocessor system includes a function block that receives and outputs an analog signal. For example, the function block generates a driving signal of a stepping motor that moves a head of a recorder. The function block comprises a digital-to-analog (D/A) converter and the D/A converter is connected to an address bus and a data bus, as are a CPU and a main memory of the microprocessor system.

The number of digital drive data (waveform data) necessary for rotating a stepping motor are stored in the main memory. The CPU reads the drive data from the main memory at predetermined intervals and transfers the data to the D/A converter. That is, the drive data is repetitively transferred to the D/A converter from the main memory. The D/A converter generates a driving signal having a voltage that corresponds to the drive data. In this manner, the driving signal having a predetermined analog waveform is supplied to a stepping motor in order to rotate the stepping motor.

However, requiring the CPU to repetitively transfer drive data from the main memory to the D/A converter pits a load on the CPU. Further, when the CPU performs an operation of another application, the CPU cannot transfer the drive data. Consequently, the desired analog waveform is not obtained.

To reduce the load on the CPU, a memory can be provided to the function block having the D/A converter. However, the function block memory is not connected directly to the address bus and the data bus. Accordingly, I/O port addresses used for allowing the CPU to input and output data to and from the function block need to be allocated for the number of data pieces in the function block memory. The microprocessor system then has a problem of having an insufficient number of I/O port addresses.

SUMMARY OF THE INVENTION

A first object of the present invention is provide a data I/O system which reduces a load on a CPU caused by the transfer of data from a memory.

A second object of the present invention is to provide a data I/O system that transfers data to a function block memory without increasing the number of I/O port addresses.

In a first aspect of the present invention, a data input/output (I/O) system connected to an address bus and a data bus is provided. The system includes a first register and a memory. The register stores data from the data bus in response to an access signal supplied from the address bus. The memory receives the data stored in the first register and inputs and outputs data from and to the data bus using the data as an address signal.

In a second aspect of the present invention, a data I/O system is provided that includes an analog-to-digital (A/D) converter that converts an analog signal to a digital signal. A memory is connected to the A/D converter to store the digital signal. A register is connected to the memory to store an address signal. An address generation circuit is connected to the register to generate the address signal and supply the address signal to the register.

In a third aspect of the present invention, a data I/O system is provided that includes a first function block, a second function block connected to the first function block and a processor. The first functional block includes a first register that stores a first address signal and a first memory that receives the first address signal stored in the first register and inputs and outputs data in accordance with the first address signal. A first address generation circuit generates the first address signal successively and supplies the first address signal to the first register. A digital-to-analog (D/A) converter receives data from the first memory and converts the data to an analog signal. The second function block includes an analog-to-digital (A/D) converter that converts the analog signal to a digital signal and a second memory that stores the digital signal. A second register is connected to the second memory to store a second address signal. A second address generation circuit is connected to the second register to generate the second address signal successively and supply the second address signal to the second register. The processor receives the digital signal from the second memory, corrects the data stored in the first memory, and supplies the corrected data to the first memory.

In a fourth aspect of the present invention, a method for inputting and outputting data is provided. The method includes the steps of storing an address signal from an address bus in a register, writing data to a storage device in accordance with the address signal stored in the register, storing a circulating address signal in the register, and reading data from the storage device in accordance with the circulating address signal stored in the register.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
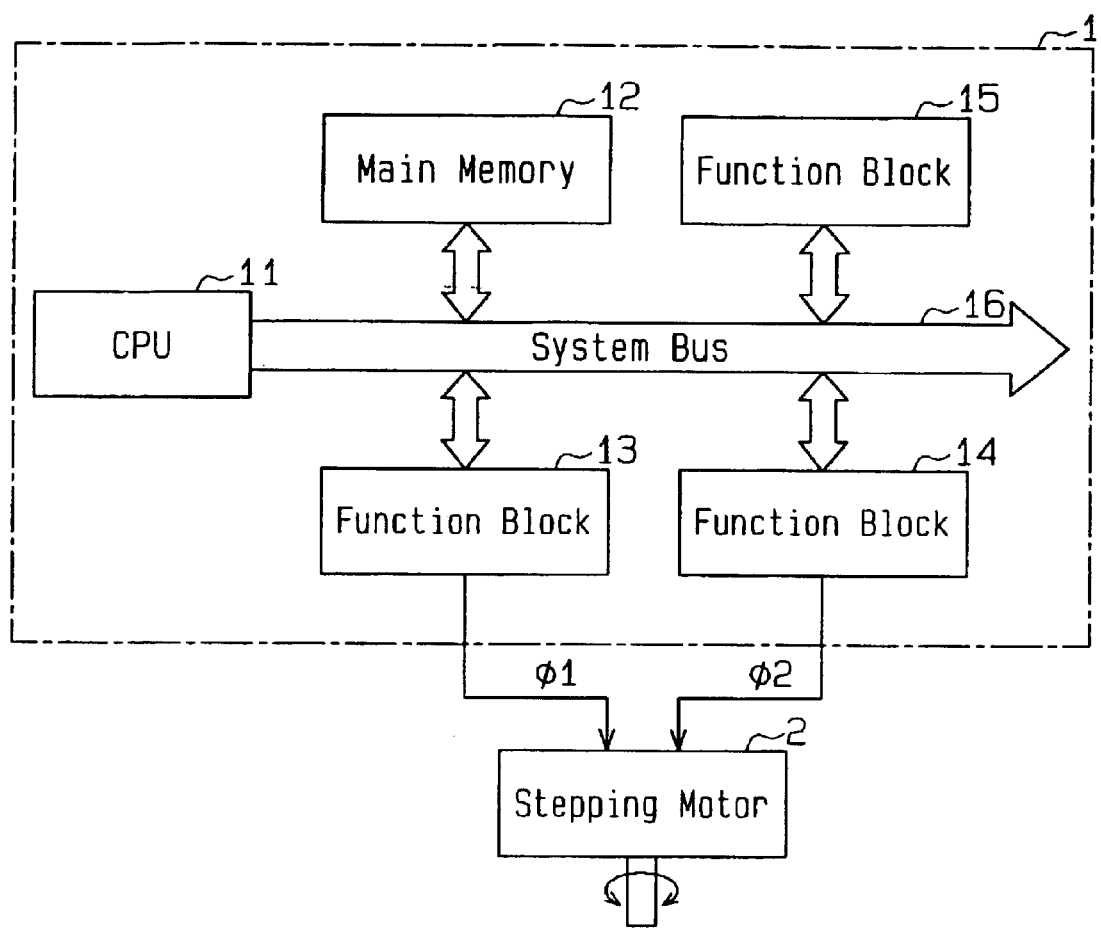
FIG. 1 is a schematic block diagram of a microprocessor system according to one embodiment of the present invention.

In the drawings, like numerals are used for like elements throughout.

FIG. 1 is a schematic block diagram of a microprocessor system 1 according to a first embodiment of the present invention. The microprocessor system 1 is installed in a personal digital assistant (PDA) and generates driving signals $\phi 1$, $\phi 2$ for driving a stepping motor 2 which moves the head of a DVD-ROM unit.

The microprocessor system 1 comprises a CPU 11, a main memory 12 and first through third function blocks 13, 14 and 15, all of which are connected together via a system bus 16. The main memory 12 stores a program executed by the CPU 11 and data necessary for execution of the program. The CPU 11 directly accesses the main memory 12 via the system bus 16 to execute the program.

Each of the first and second function blocks 13 and 14 has a data storage function and a digital-to-analog (D/A) conversion function and stores drive data supplied from the CPU 11. The drive data is used for rotating the stepping motor 2 a predetermined number of rotations (for example, one rotation) Each of the function blocks 13, 14 has a memory capacity sufficient for storing the drive data.

The first and second function blocks 13, 14 D/A convert the drive data in accordance with a drive command from the CPU 11, generate driving signals $\phi 1$ and $\phi 2$ having a predetermined number of cycles, and supply the driving signals $\phi 1$, $\phi 2$ to the stepping motor 2. In this embodiment, values of the drive data are set so that the driving signals $\phi 1$, $\phi 2$ substantially form a sine wave.

The third function block 15 is a circuit for providing predetermined functions such as a counter circuit, a timer circuit and a serial communication circuit.

Figure 2:
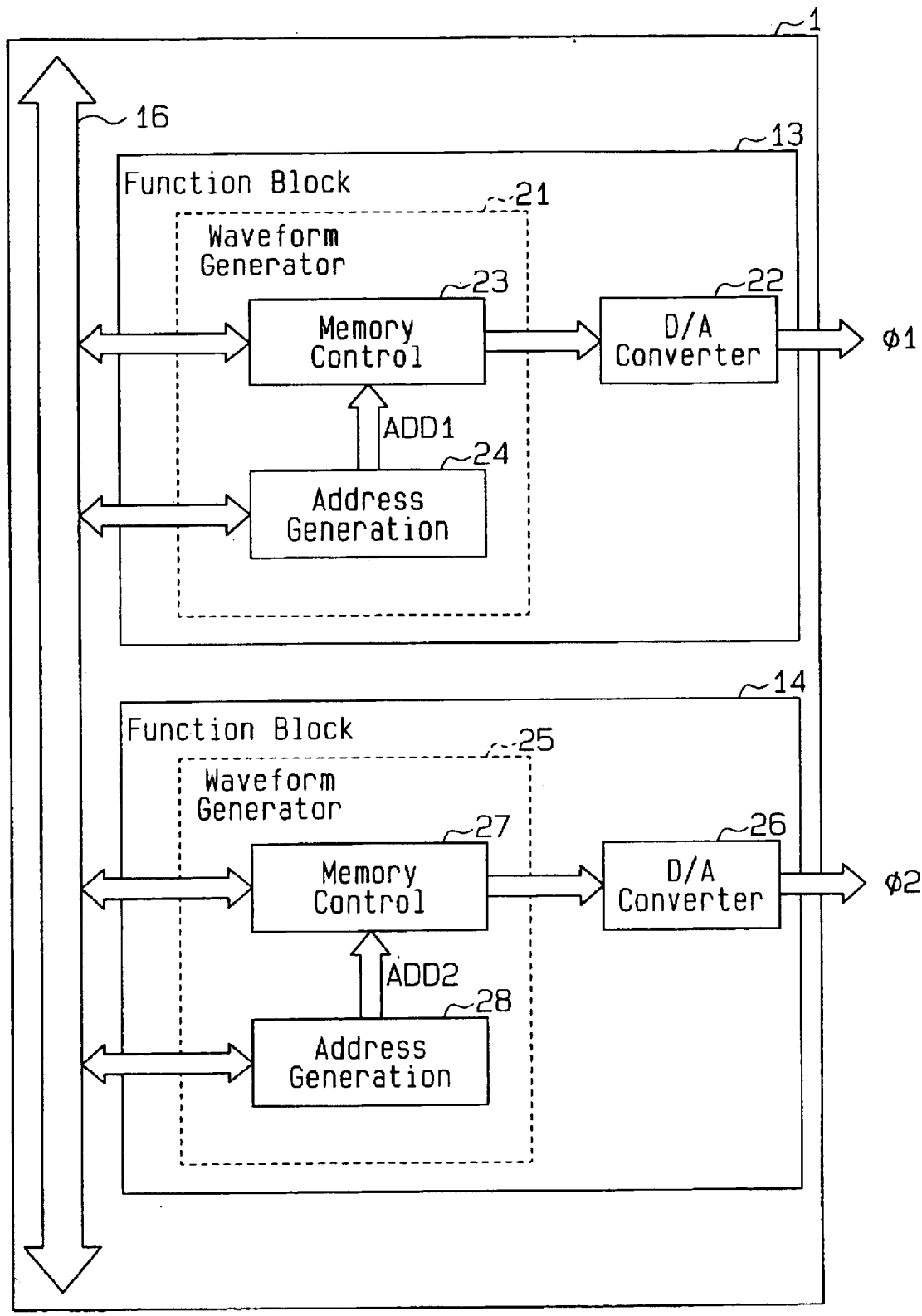
FIG. 2 is a schematic block diagram of a function block of the microprocessor system of FIG. 1.

FIG. 2 is schematic block diagram of the first and second function blocks 13, 14. The first function block 13 comprises a waveform generator 21 and a digital-to-analog (D/A) converter 22. The waveform generator 21 includes a memory control circuit 23 and an address generation circuit 24. The memory control circuit 23 stores drive data and includes a memory having a predetermined capacity. The address generation circuit 24 generates a circulating address signal ADD1 so that the memory area in which the drive data is stored is repetitively accessed and supplies the address signal ADD1 to the memory control circuit 23. The memory control circuit 23 repetitively supplies the drive data to the D/A converter 22 in accordance with the address signal ADD1. The D/A converter 22 converts the drive data and generates the driving signal $\phi 1$.

In the present embodiment, the memory control circuit 23 continuously supplies drive data to the D/A converter 22 in accordance with the address signal. Accordingly, the CPU 11 writes the drive data for one cycle of the driving signal $\phi 1$ to the memory control circuit 23 and instructs generation and stop of the address signal ADD1 to the address generation circuit 24. Therefore, the CPU 11 does not need to supply drive data to the D/A converter 22 every predetermined time, and thus the load on the CPU 11 is reduced.

The second function block 14 comprises a waveform generator 25 and a D/A converter 26. The waveform generator 25 includes a memory control circuit 27 and an address generation circuit 28. The memory control circuit 27 stores drive data supplied from the CPU 11 via the system bus 16 and supplies the drive data to the D/A converter 26 in accordance with the circulating address signal ADD2 generated by the address generation circuit 28. The D/A converter 26 converts the drive data and generates the driving signal 42. Accordingly, the load on the CPU 11 is reduced.

The memory control circuit 23 and the address generation circuit 24 are described below. Since the configurations of the memory control circuit 27 and the address generation circuit 28 are same as the memory control circuit 23 and the address generation circuit 24, their drawings and their description are omitted.

Figure 3:
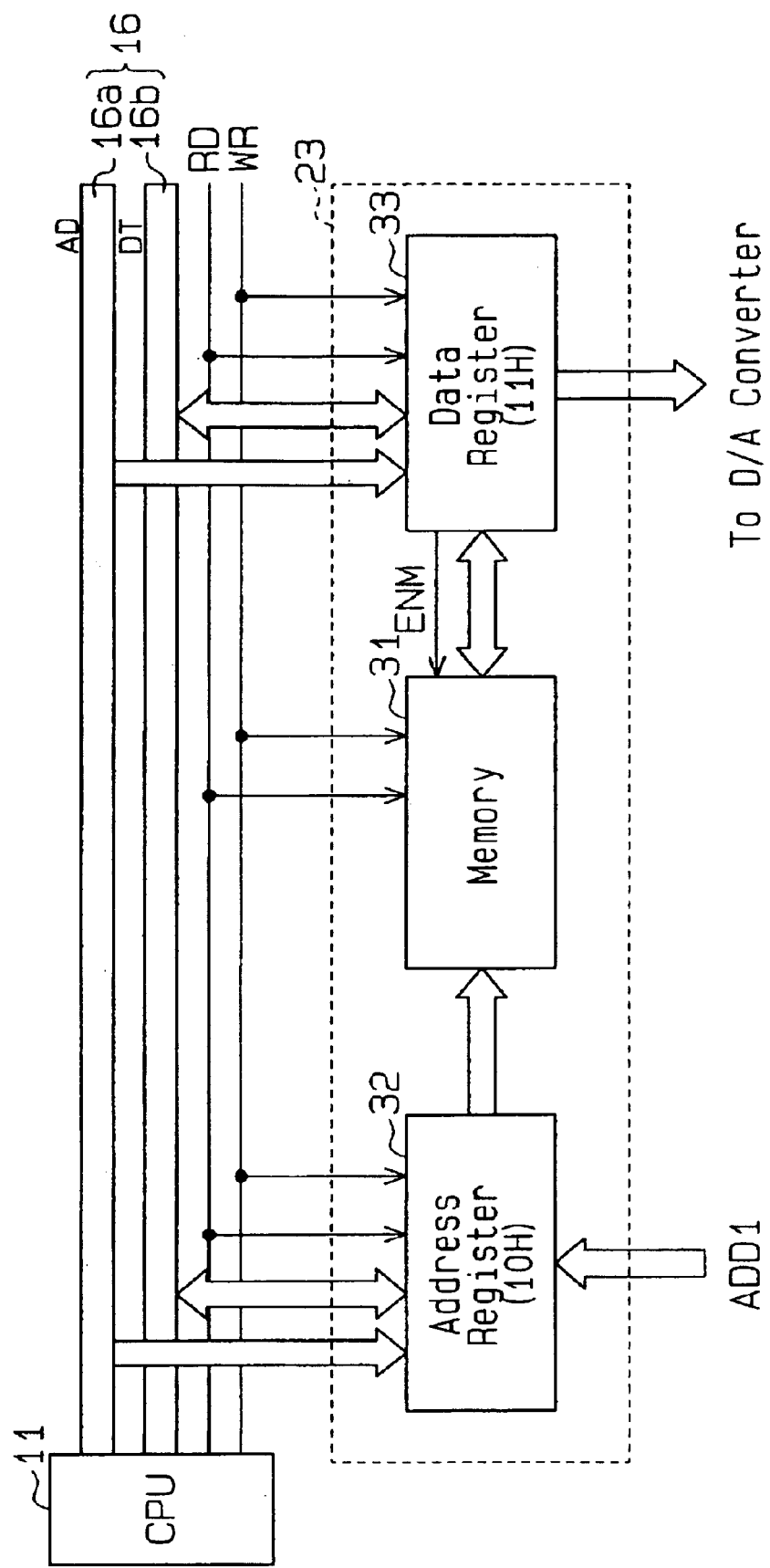
FIG. 3 is a schematic block diagram of a memory control circuit of the function block of FIG. 2.

FIG. 3 is a schematic block diagram of the memory control circuit 23. The memory control circuit 23 includes a memory 31, an address register 32 and a data register 33. In the present embodiment, the memory 31 is a RAM having the capacity specified by an 8-bit address 00H to FFH and 8-bit data is stored in each address.

The system bus 16 includes an address bus 16a and a data bus 16b each having an 8-bit bus width. The address register 32 and the data register 33 are connected to the address bus 16a and the data bus 16b, respectively. The address register 32 and the data register 33 temporarily store an address AD and data DT supplied from the CPU 11, respectively and are responsive to a read strobe RD and a write strobe WR supplied from the CPU 11, respectively.

The address register 32 and the data register 33 have the number of bits (eight bits) which correspond to the address and data of the memory 31 and are arranged in a predetermined I/O area. In the present embodiment, the address register 32 is allocated to an I/O port address "10H" and the data register 33 is allocated to "11H".

When an address AD that specifies "10H" is supplied from the CPU11 and a write strobe WR is active, the data DT supplied from the CPU 11 is stored in the address register 32. Further, when the address AD that specifies "10H" is supplied from the CPU 11 and a read strobe RD is active, the data DT is read from the address register 32.

When the address AD that specifies "11H" is supplied from the CPU 11 and the write strobe WR is active, the data DT supplied from the CPU 11 is stored in the data register 33. Further, when the address AD that specifies "11H" is supplied from the CPU 11 and the read strobe RD is active, the data DT is read from the data register 33.

The memory 31 has an address terminal connected to the address register 32 and a data terminal connected to the data register 33 and operates in accordance with the read strobe RD and the write strobe WR supplied from the CPU 11. When the memory 31 receives 8-bit data from the address register 32 as an address signal and the read strobe RD is active, the memory 31 performs a read operation for transferring the data stored in the memory 31 to the data register 33. When the write strobe WR is active, the memory 31 performs a write operation for storing the data from the data register 33 in the memory 31.

Figures 4, 5:
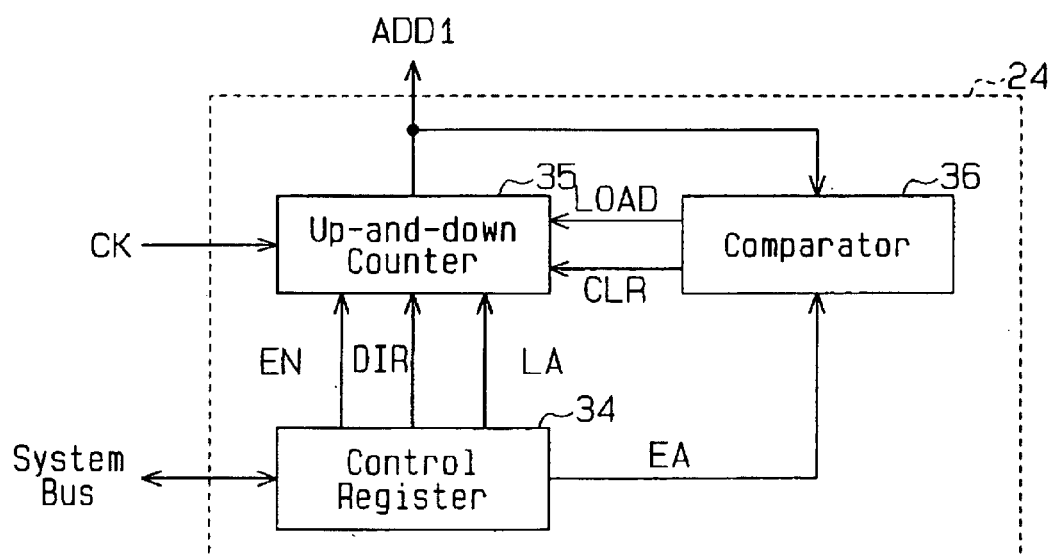
FIG. 4 is a timing diagram of the memory control circuit of FIG. 3.
FIG. 5 is a schematic block diagram of an address generator of the function block of FIG. 2.

FIG. 4 is a timing chart showing access to the memory 31.

First, the write operation to the memory 31 is described. As shown in FIG. 4, the write operation is performed from the third cycle T3 to the sixth cycle T6. The CPU 11 stores a write address "00H" of the memory 31 in the address register 32 at the third cycle T3. That is, an address AD which specifies the I/O port address "10H" of the address register 32 and write address data DT are output from the CPU 11. The address "00H" is transferred from the address register 32 to the memory 31.

Then, the CPU 11 stores write data "80H" in the data register 33 at the fourth cycle T4. The data "80H" is transferred from the data register 33 to the memory 31 and is stored in the memory 31 at the address "00H".

Subsequently, the CPU 11 stores a write address "04H" in the address register 32 at the fifth cycle T5 and the write address "04H" is transferred to the memory 31. The CPU 11 stores write data "FFH" in the data register 33 at the sixth cycle. The write data "FFH" is transferred to the memory 31 and is stored in the memory 31 at the address "04H".

Next, the read operation for reading the data stored in the memory 31 is described.

As shown in FIG. 4, the read operation to the address register 32 is performed at the seventh cycle and the read operation to the data register 33 is performed at the eighth cycle T8. The read operation to the memory 31 is performed at the ninth and tenth cycles.

When the CPU 11 specifies an I/O port address "10H" at the seventh cycle T7, the address stored finally in the address register 32 (that is, address "04H" stored in the address register 32 at the fifth cycle T5) is read therefrom as data DT and is supplied on the data bus 16b.

When the CPU 11 specifies an I/O port address "11H" at the eighth cycle T8, the data stored finally in the data register 33 (that is, data "FFH" stored in the data register 33 at the sixth cycle T6) is read as data DT and is supplied on the data bus 16b.

When the CPU 11 stores a read address "00H" of the memory 31 in the address register 32 at the ninth cycle T9, the read address "00H" is transferred to the memory 31 and the data "80H" read from the read address "00H" of the memory 31 is transferred to the data register 33.

When the CPU 11 specifies an I/O port address "11H" at the tenth cycle T10, the data stored in the data register 33 (that is, the data "80H" stored in the data register 33 at the ninth cycle T9) is read and supplied on the data bus 16b.

FIG. 5 is a schematic block diagram of the address generation circuit 24. The address generation circuit 24 includes a control register 34, an up-and-down counter 35 and a comparator 36.

The control register 34 stores data for a predetermined number of bits and is allocated a predetermined I/O port address a (for example, 18H). The control register 34 is connected to the system bus 16. The control register 34 stores control data and a count end address supplied from the CPU 11. The control data includes an enable bit for controlling the start/stop of the up-and-down counter 35 and a switching bit for switching the count direction of the up-and-down counter 35. The control register 34 supplies an enable signal EN that corresponds to the enable bit and a switching signal DIR that corresponds to the switching bit to the up-and-down counter 35.

To generate the circulating address signal ADD1, the control register 34 supplies an initial value LA to the up-and-down counter 35 and an end value EA to the comparator 36 as the count end address.

The up-and-down counter 35 performs the count operation of the clock signal CK in response to the enable signal EN from the control register 34. The up-and-down counter 35 performs an increment operation in response to the switching signal DIR having the H level from the control register 34, a decrement operation in response to the switching signal DIR having the L level, and outputs a count value as the address signal ADD1.

The comparator 36 compares the end value EA and the count value in the increment operation mode of the up-and-down counter 35 and activates a clear signal CLR when the count value matches the end value EA. The comparator 36 activates a load signal LOAD when an underflow of the count value is detected in the decrement operation mode of the up-and-down counter 35.

The up-and-down counter 35 clears the count value to "00H" in response to the clear signal CLR being active. Accordingly, in the increment mode, when the end value EA is "1FH", for example, the count value (that is, address signal ADD1) varies as ". . . , 1E, 1F, 0, 1, 2, . . . ". Consequently, the address generation circuit 24 generates a circulating address signal ADD1 by increasing the count value from zero to the end value.

The up-and-down counter 35 sets the count value to the initial value LA in response to the active load signal LOAD. Accordingly, in the decrement mode, when the initial value LA is "1FH", for example, the count value varies as ". . . , 2, 1, 0, 1F, 1E, . . . ". Consequently, the address generation circuit 24 generates the circulating address signal ADD1 by decreasing the count value from zero to the end value EA.

Figure 6:
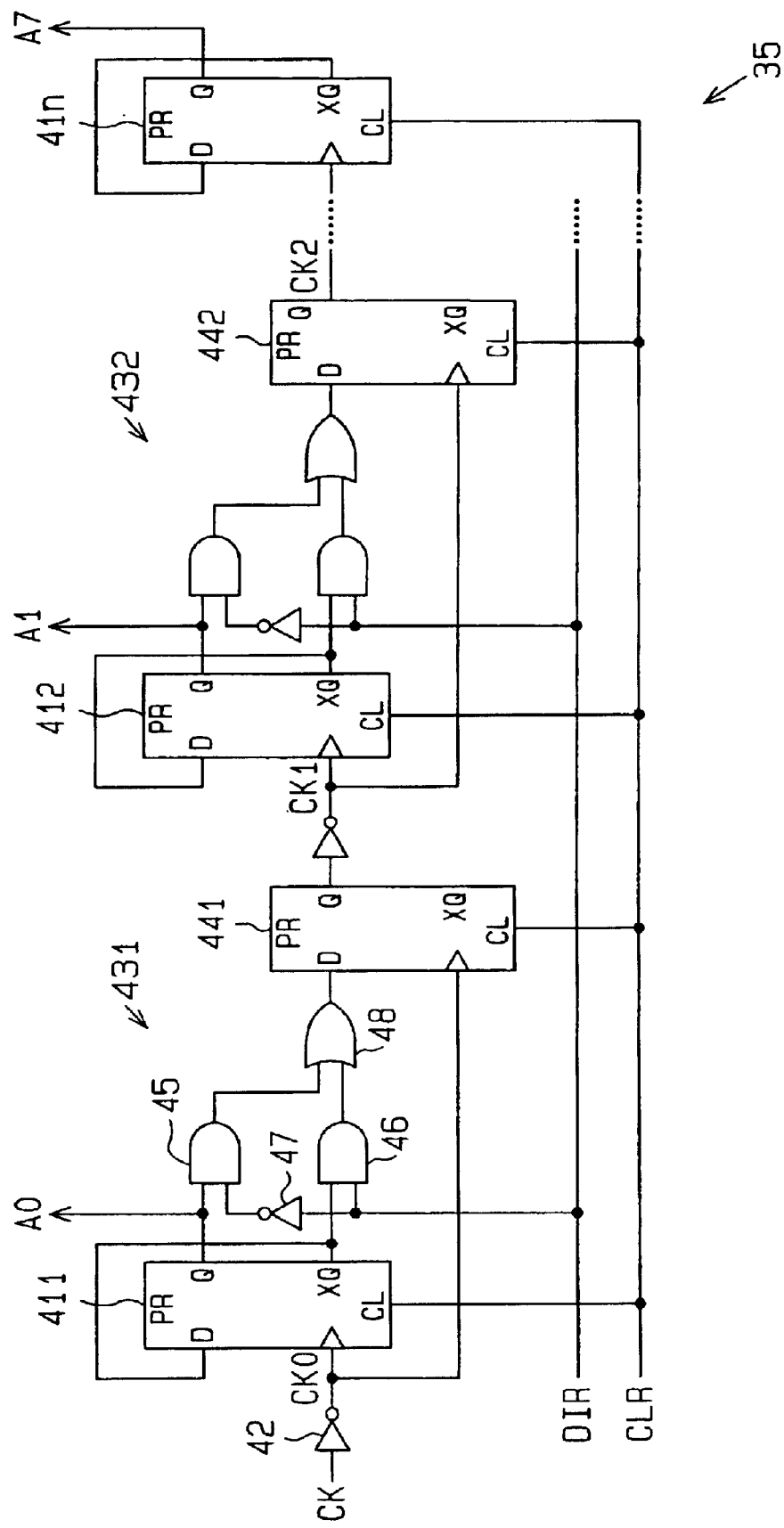
FIG. 6 is a schematic block of an up-and-down counter of the address generator of FIG. 5.

FIG. 6 is a partial schematic circuit diagram of the up-and-down counter 35. In FIG. 6, since a circuit that performs a count operation in response to the enable signal EN and a circuit for setting the initial value are well known in the art, these circuits are omitted. The up-and-down counter 35 includes a plurality of (seven in this embodiment) flip-flops 411, 412, . . . , 41n connected in series. That is, the number of flip-flops corresponds to the number of bits of the address signal ADD1. An inverse clock signal CK0 from an inverter circuit 42 is supplied to the clock input terminal of the first-stage flip-flop 411, and the up-and-down counter 35 counts the clock signal CK pulses.

Switching circuits 431, 432, . . . for switching the count direction and flip-flops 441, 442, . . . for eliminating unnecessary pulses generated at switching of the count direction are connected between each adjacent pair of flip-flops 411 to 41n.

Specifically, a complementary output terminal XQ of the flip-flop 411 is connected to its input terminal D and the flip-flop 411 outputs a first address signal bit A0 from its output terminal Q. The output terminal Q and the complementary output terminal XQ of the flip-flop 411 are connected to the switching circuit 431. The switching circuit 431 includes two NAND circuits 45, 46, an inverter circuit 47 and an OR circuit 48.

The output terminal Q of the flip-flop 411 is connected to the first input terminal of the NAND circuit 45 and the complementary output terminal XQ of the flip-flop 411 is connected to the first input terminal of the NAND circuit 46.

The inverted switching signal DIR from the inverter circuit 47 is supplied to the second input terminal of the NAND circuit 45 and the switching signal DIR is supplied to the second input terminal of the NAND circuit 46. The two output terminals of the NAND circuits 45, 46 are connected to the two input terminals of the OR circuit 48, respectively and the output terminal of the OR circuit 48 is connected to the input terminal D of the flip-flop 441. The clock signal CK0 is supplied to the clock input terminal of the flip-flop 441 and the clock signal CK1 is supplied from the output terminal Q to the flip-flop 412.

The clear signal CLR is supplied to the clear terminals CL of the flip-flops 411, 441 and the first bit of the initial value LA is supplied to the preset terminal PR of the flip-flop 411.

Since the switching circuit 432 and the flip-flop 442 and other switching circuit and flip-flop are substantially same as the switching circuit 431 and the flip-flop 441, their descriptions are omitted.

Figure 7:
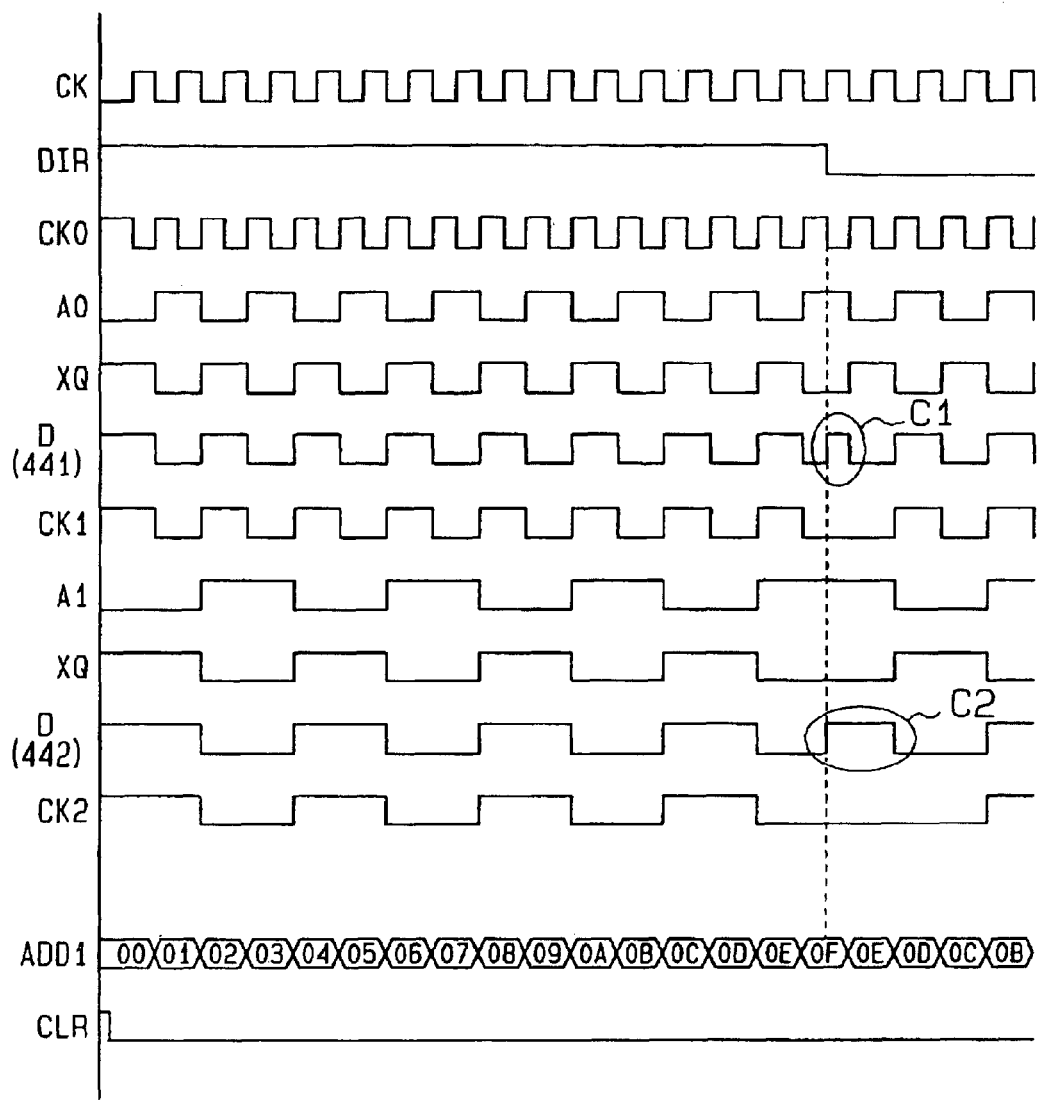
FIG. 7 is a timing diagram of the up-and-down counter of FIG. 5.

FIG. 7 is a timing diagram of the up-and-down counter 35.

When the clear signal CLR goes low, the up-and-down counter 35 counts the falling frequency of the clock signal CK in accordance with the switching signal DIR having the H level and outputs the address signal ADD1 while increasing the count value as "00, 01, 02, . . . ". When the switching signal DIR goes low, the up-and-down counter 35 starts the decrement operation. At this time, as shown in FIG. 7 as an oval C1, an unnecessary pulse signal is generated at the input terminal D of the flip-flop 441. However, since the clock signal CK0 supplied to the clock input terminal of the flip-flop 441 does not rise, the clock signal CK1 having the L level which does not include the pulse is supplied to the flip-flop 412. As a result, the up-and-down counter 35 accurately performs the decrement operation and outputs the count value (address signal ADD1). Similarly, an unnecessary pulse (pulse surrounded by an oval C2) is generated at the input terminal D of the flip-flop 442. However, since the clock signal CK1 supplied to the clock input terminal does not rise, the clock signal CK2 having the L level which does not include the pulse is supplied to the next flip-flop.

Figure 8:
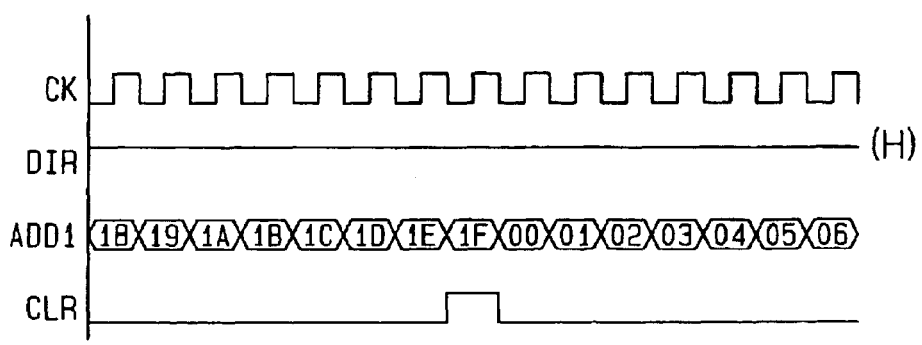
FIG. 8 is a timing diagram of the address generator of FIG. 5.

FIG. 8 is a timing diagram of the address generation circuit 24.

For example, the up-and-down counter 35 performs the increment operation in accordance with the switching signal DIR having the H level from the control register 34 and increases the count value as "18, 19, 1A, . . . ". The comparator 36 compares the count value and the end value EA ("1FH" in this case), and when the count value matches the end value, the comparator 36 supplies the clear signal CLR having the H level to the up-and-down counter 35. The up-and-down counter 35 clears the count value in response to the clear signal CLR. The address generation circuit 24 generates the address signal ADD1 in which an address value circulates as "00,01, . . . , 1F, 00, . . . ".

Figure 9:
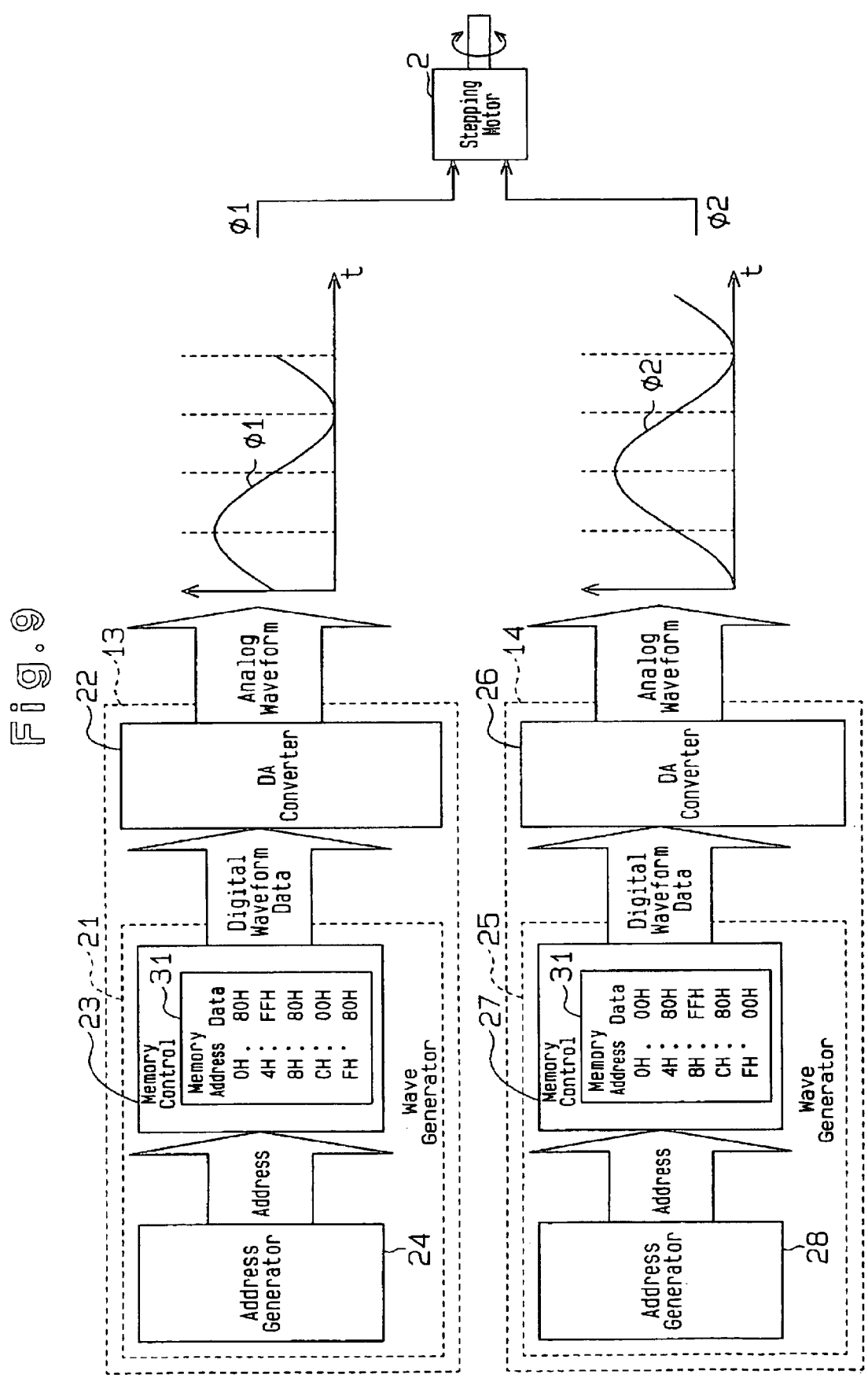
FIG. 9 is a schematic block diagram for describing the operation of the function block of FIG. 2.

Next, the operations of the function blocks 13, 14 in the microprocessor system 1 are described with reference to FIG. 9.

First, the CPU 11 stores first drive data for one cycle for driving the stepping motor 2 in the memory 31 at the addresses "0H" to "FH" in the first function block 13 and stores second drive data having the phase difference of 90 degrees with the first drive data in the memory 31 of the second function block 14.

Then, the CPU 11 supplies a count end address "FH" to the address generation circuits 24, 28 of the function blocks 13, 14. Further, the CPU 11 supplies the switching data which corresponds to the rotation direction of the stepping motor 2 to the address generation circuits 24, 28.

The CPU 11 supplies enable data to the address generation circuits 24, 28 and activates the address generation circuits 24, 28. Then, each of the address generation circuits 24, 28 counts the pulses of the clock signal CK and generates the circulating address signals ADD1 and ADD2 in which the count value varies as "0, 1, 2, . . . , F, 0, . . . ". The memory control circuits 23, 27 supply drive data to the D/A converters 22, 26 in accordance with the circulating address signals ADD1, ADD2. The D/A converters 22, 26 generate the analog driving signals φ1, φ2 having a phase difference of 90 degrees and rotates the stepping motor 2 in the predetermined direction according to the driving signals φ1, φ2.

The rotation direction of the stepping motor 2 is determined depending on the phase relationship of the drive data stored in the function blocks 13, 14 and the count directions of the address generation circuits 24, 28. For example, if the stepping motor 2 rotates forward when the address generation counts 24, 28 perform the increment operations, the stepping motor 2 rotates backward by performing the decrement operations.

The microprocessor system 1 of the present embodiment has the following advantages:

(1) The address register 32 is selectively activated by the read strobe RD and the write strobe WR supplied via the address bus 16a and stores data from the data bus 16b when activated. The data stored in the address register 32 is supplied to the memory 31, which is not connected to the address bus 16a, as the address signal and the memory 31 inputs and outputs the data to and from the data bus 16b in accordance with the address signal. As a result, the entire storage area of the memory 31 can be accessed via the address register 32, thereby eliminating the need for increasing an I/O port address to access the memory 31 from directly the CPU 11.

(2) The waveform generators 21, 25 of the first and second function blocks 13, 14 have the address generation circuits 24, 28 which generate the address signals ADD1, ADD2 to successively access the memories 31 of the memory control circuits 23, 27. Accordingly, the analog driving signals φ1, φ2 are repetitively generated by repetitively accessing the memory 31 without applying a load to the CPU 11 and supplying the drive data stored in the memory 31 to the D/A converters 22, 26.

(3) The address generation circuits 24, 28 supply the circulating address signals ADD1, ADD2 to the memory control circuits 23, 27. Accordingly, since the drive data is repetitively supplied from the memory control circuits 23, 27 to the D/A converters 22, 26, the analog driving signals φ1, φ2 having predetermined cycles are easily generated.

Figure 10:
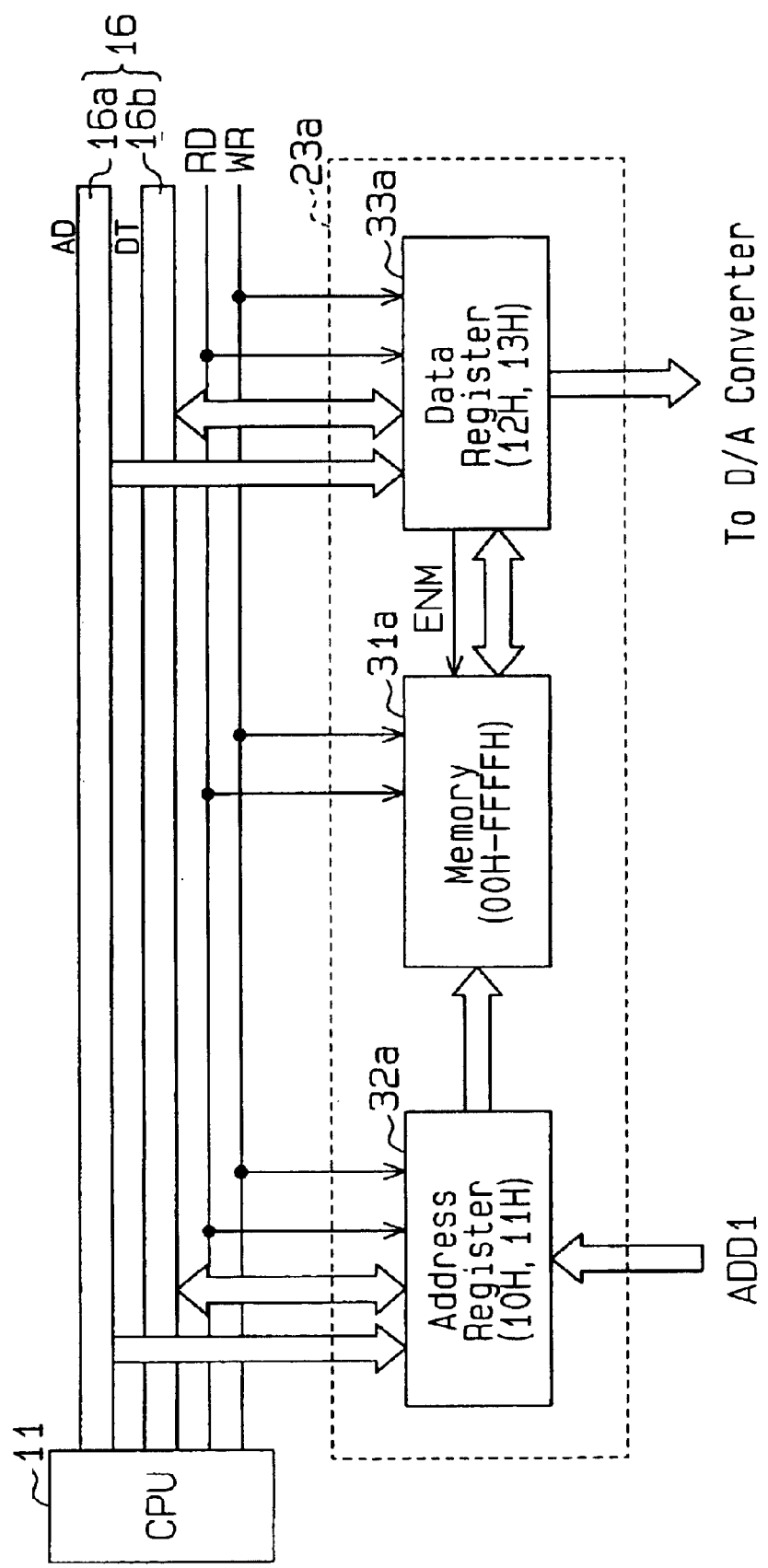
FIG. 10 is a schematic block diagram of a memory control circuit according a second embodiment of the present invention.

It should be apparent to those skilled in the art that the present invention may be embodied in many other specific forms without departing from the spirit or scope of the invention Particularly, it should be understood that the invention may be embodied in the following forms.

a) The number of bits of the address and data of the memory 31 need not be equal to the bus width (eight bits) of the data bus 16b. For example, a memory control circuit 23a of FIG. 10 comprises a memory 31a, whose address and data widths are 16 bits, and an address register 32a and a data register 33a that correspond to the address and data widths.

Figure 11:
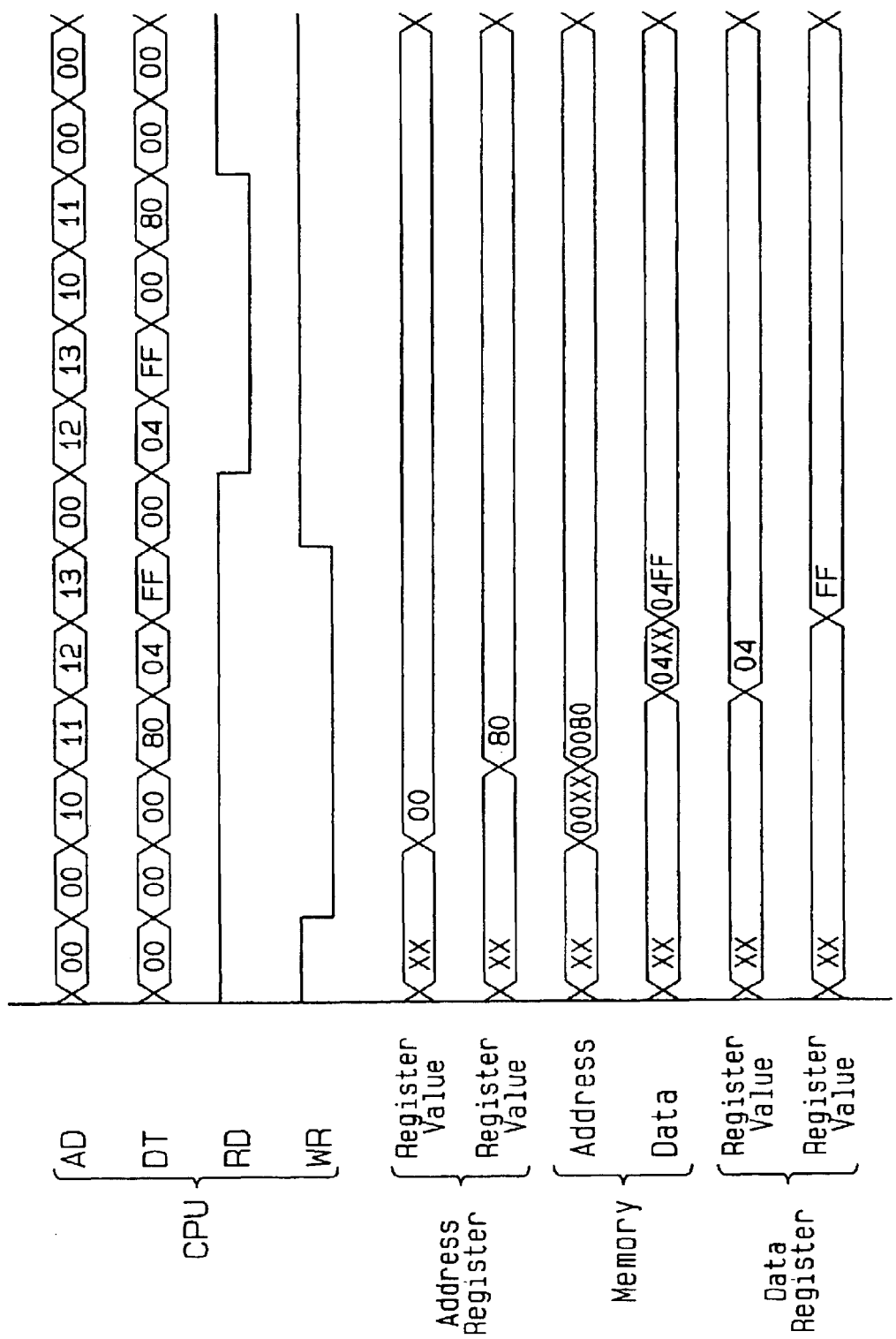
FIG. 11 is a timing diagram of the memory control circuit of FIG. 10.

FIG. 11 is a timing diagram of the memory control circuit 23a. The address register 32a having a 16-bit configuration is arranged for two I/O port addresses "10H", "11H" in units of eight bits. The data register 33a having the 16-bit configuration is arranged for two I/O port addresses "12H", "13H" in units of eight bits. The address register 32a and the data register 33a store 16-bit data.

Figure 12:
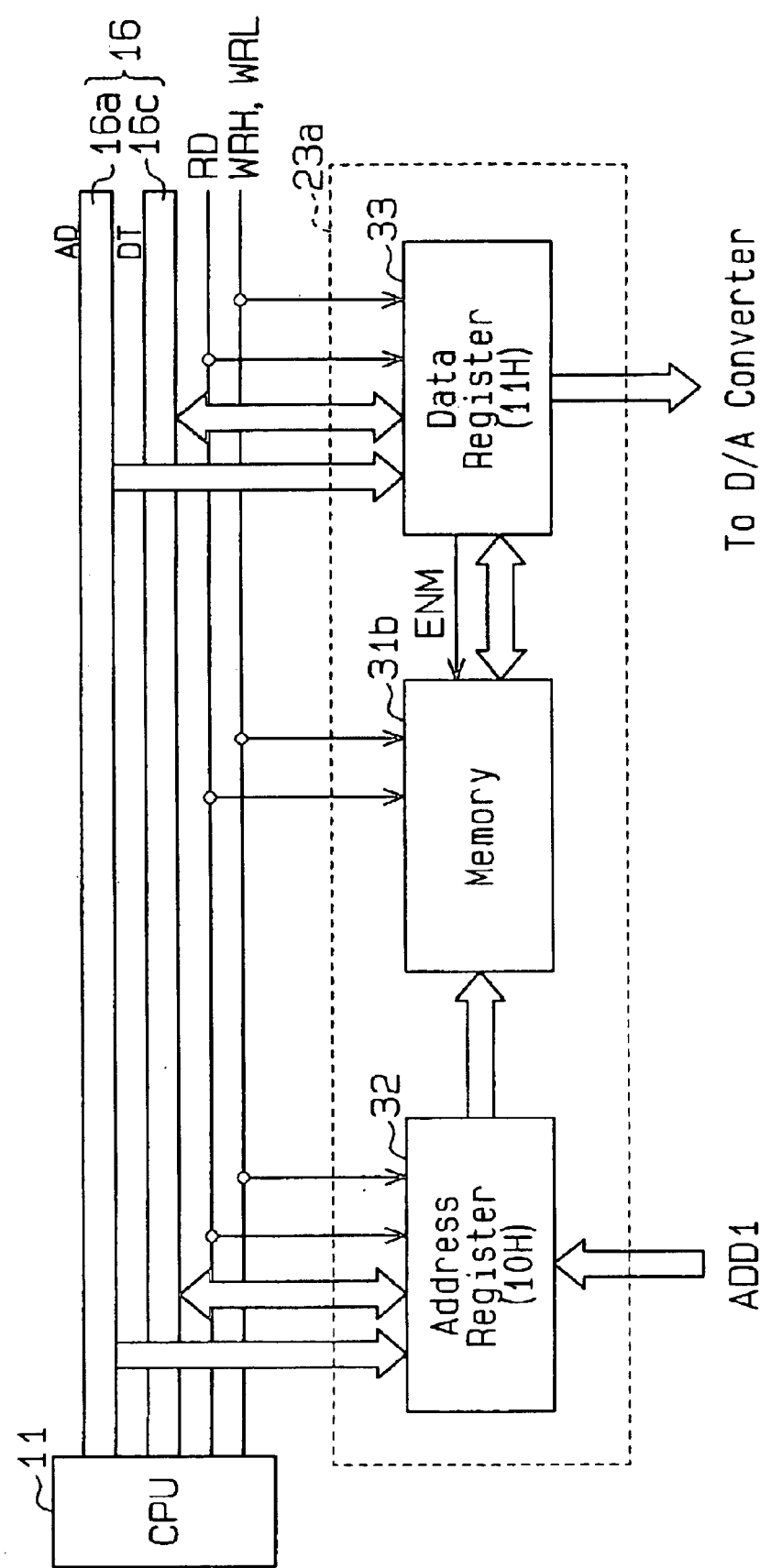
FIG. 12 is a schematic block diagram of a memory control circuit according to a third embodiment of the present invention.

FIG. 12 shows an example in which the address and data of the memory 31b are eight bits and the bus widths of a data bus 16c are 16 bits.

Figure 13:
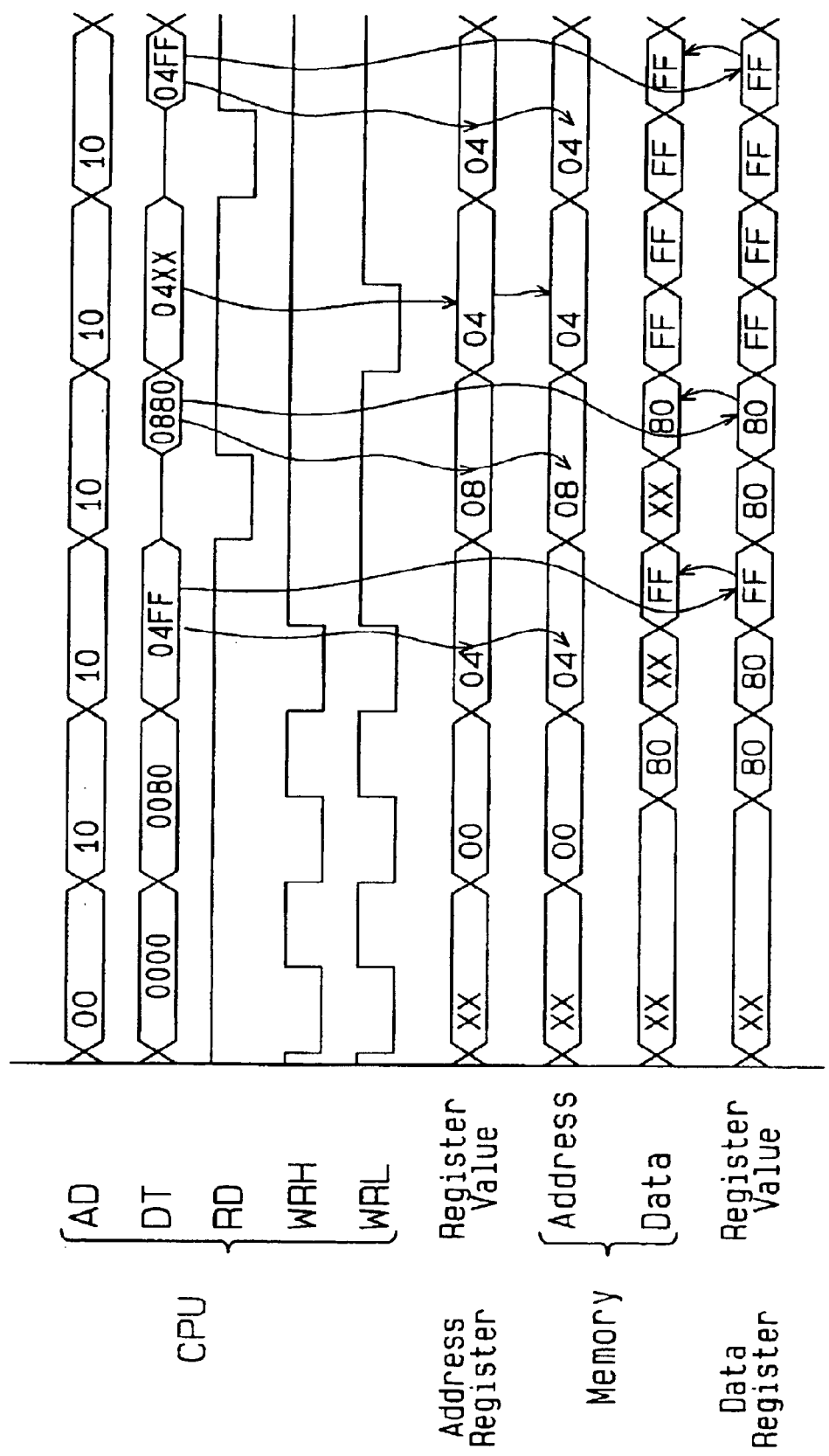
FIG. 13 is a timing diagram of the memory control circuit of FIG. 12.

FIG. 13 is a timing diagram of the memory control circuit 23a of FIG. 12. Data is stored in the address register 32 only, the data register 33 only, or both of the address register 32 and the data register 33 according to the active states of write strobes WRH and WRL supplied from the CPU 11. In this case, drive data is stored in odd-numbered address of the memory 31b.

When accessing an even-numbered address of the memory 31b in byte access, the CPU 11 activates a write strobe WRL and the address register 32. When accessing an odd-numbered address, the CPU 11 activates a write strobe WRH and the data register 33. Accordingly, the CPU 11 can store data in the address register 32 and the data register 33 in one cycle by simultaneously activating the write strobes WRH, WRL. When reading data, after the CPU 11 has changed the data of the address register 32 to the address of the memory 31 in byte access, the data is read from the memory 31 by accessing the data register 33 in accordance with the address in byte access.

b) An access (read/write operation) of the memories 31, 31a may be performed using an address decoder instead of the data registers 33, 33a.

Figure 14:
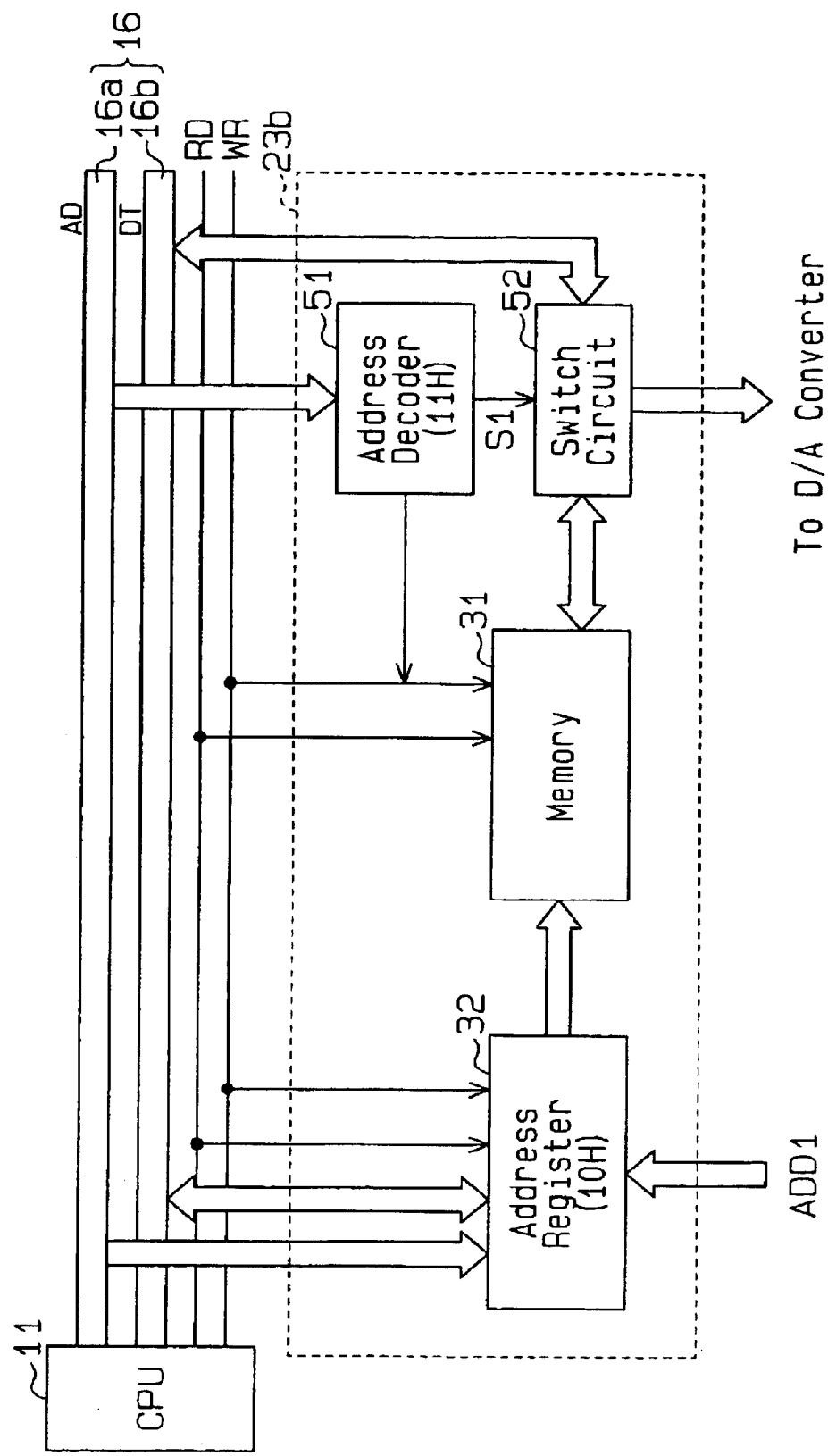
FIG. 14 is a schematic block diagram of a memory control circuit according to a fourth embodiment of the present invention.
Figure 15:
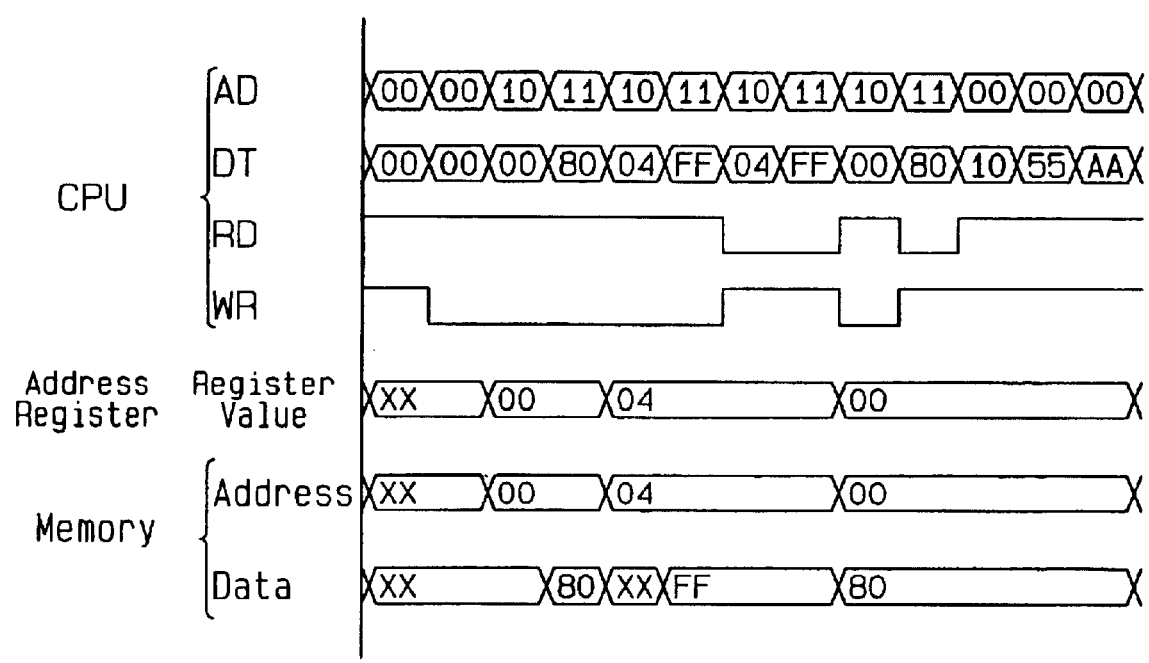
FIG. 15 is a timing diagram of the memory control circuit of FIG. 14.

FIG. 14 is a schematic block diagram of the memory control circuit 23b having an address decoder 51, and FIG. 15 is a timing diagram of the memory control circuit 23b. The memory control circuit 23b includes the memory 31, the address register 32, the address decoder 51 and a switch circuit 52. The address decoder 51 is arranged at an I/O port address "11H" and supplies a control signal S1 to the switch circuit 52 in response to access request from the CPU 11. The switch circuit 52 has the same bit width as the data bit width of the memory 31 and is turned on and off in response to the control signal S1. Accordingly, the data I/O terminal of the second memory circuit 31 is connected to the system bus (data bus 16b) via the switch circuit 52.

Figure 16:
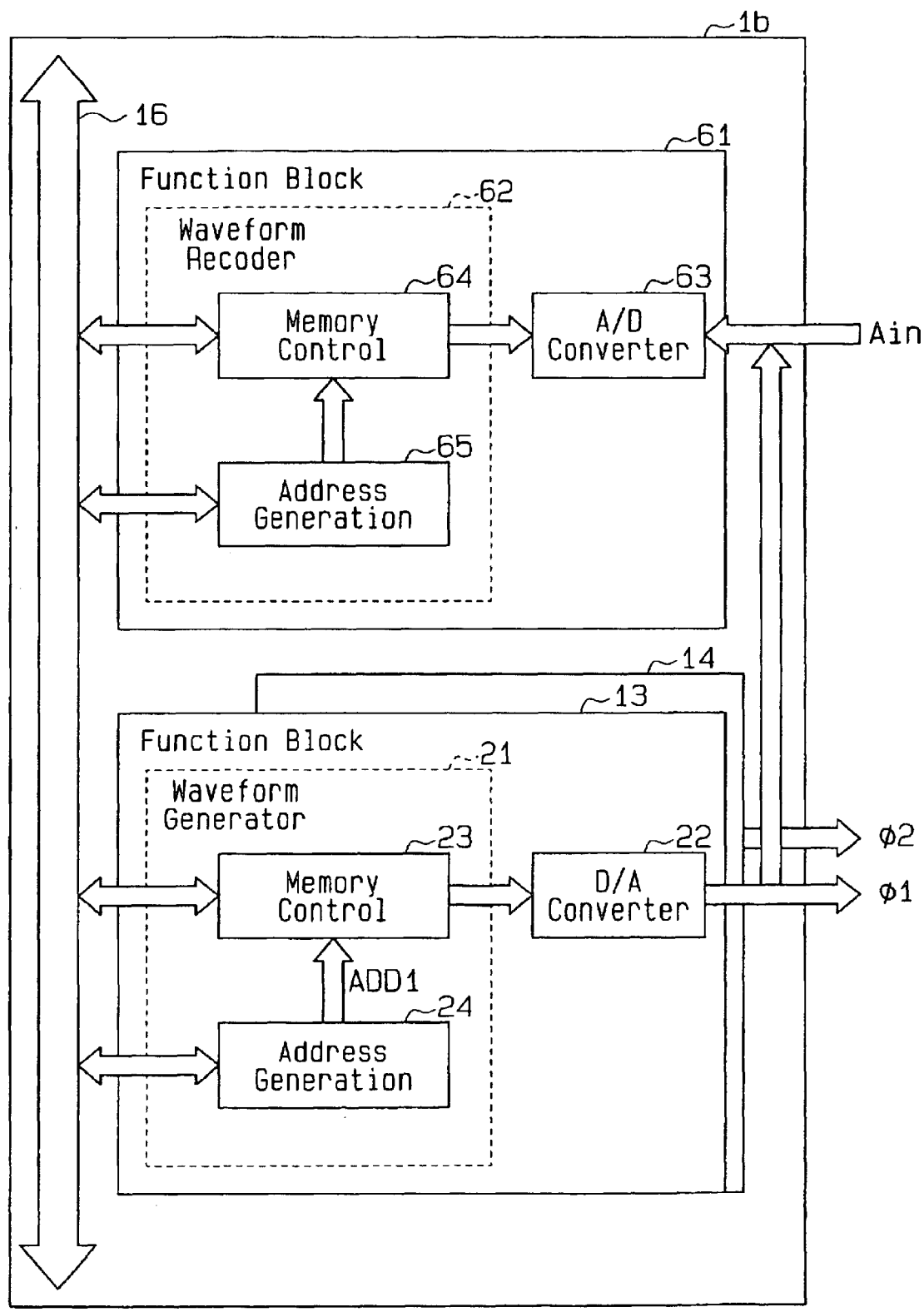
FIG. 16 is a schematic block diagram of a microprocessor system according to a fifth embodiment of the present invention.

In the state in which the data I/O terminal of the memory 31 and the data bus 16b are connected, data write is enabled when the write strobe WR is activated by the CPU 11, and data read is enabled when the read strobe RD is activated. At this time, data is input and output to and from the memory area of the memory 31 specified by the address stored in the address register 32.

c) As shown in FIG. 16, the present invention may be applied to a microprocessor system 1b provided with a third function block 61 having an analog-to-digital conversion function. The third function block 61 comprises a waveform recorder 62 and an analog-to-digital (A/D) converter 63. The A/D converter 63 converts an analog signal Ain to a digital signal and supplies the digital signal to the waveform recorder 62. The waveform recorder 62 includes a memory control circuit 64 and an address generation circuit 65. The memory of the memory control circuit 64 stores the digital signal from the analog-to-digital converter 63 in accordance with an address signal generated by the address generation circuit 65.

Figure 17:
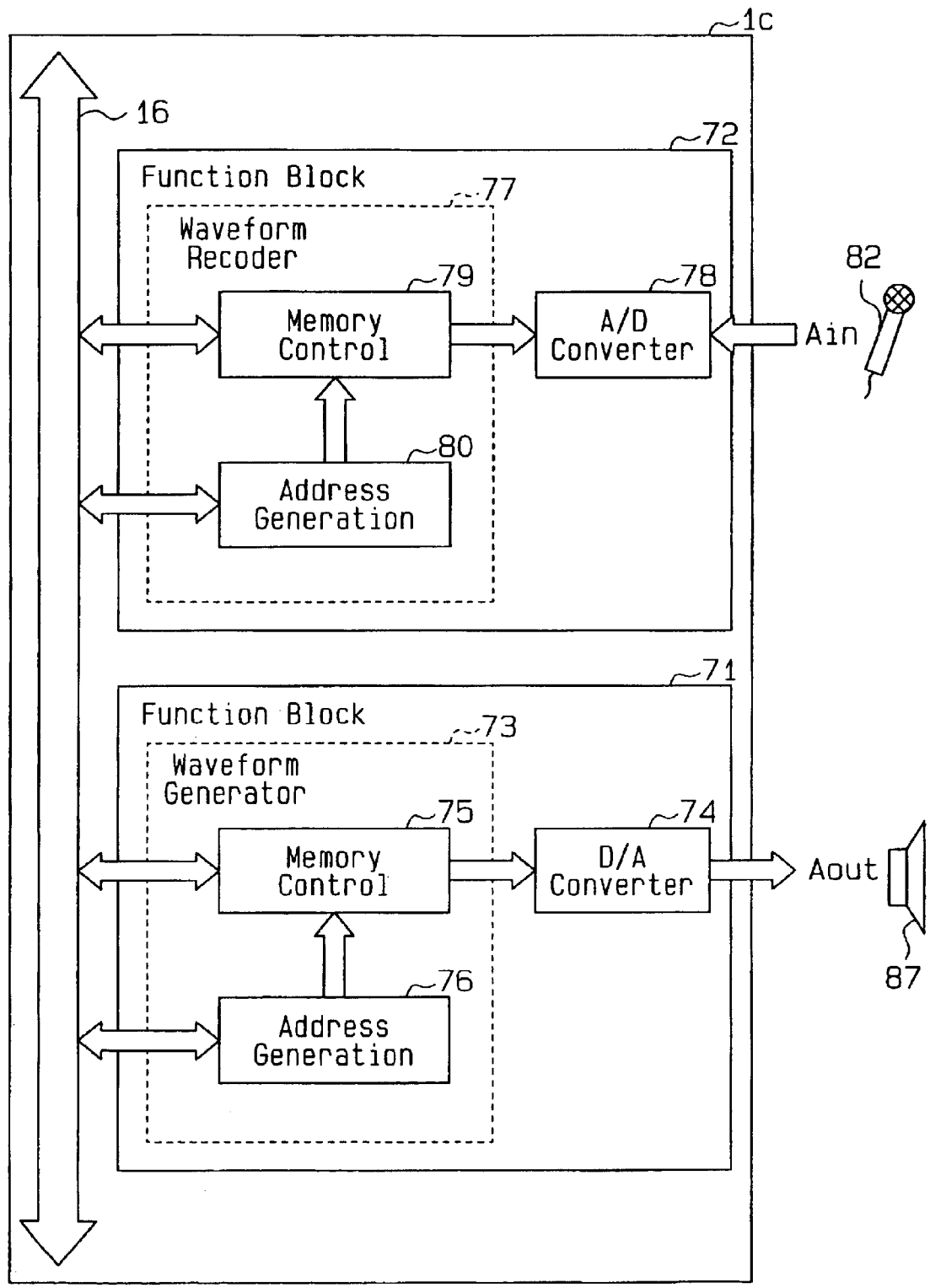
FIG. 17 is a schematic block diagram of a microprocessor system according to a sixth embodiment of the present invention.

The driving signals φ1, φ2 from the first and second function blocks 13, 14 may be supplied to the third function block 61 instead of the analog signal Ain. In this case, the memory of the memory control circuit 64 stores the digital signal generated by converting the first or second driving signal φ1 or φ2. The CPU 11 corrects the drive data stored in the memories of the memory control circuits 23 and 27 based on the digital signal so that the driving signals φ1, φ2 have desired waveforms. Thus, the driving signals φ1, φ2 are fed back to the drive data, and the driving signals φ1, φ2 having high-accuracy analog waveforms are generated.

d) The present invention may be applied to a microprocessor system which supplies an analog signal other than the driving signal of the stepping motor 2. For example, as shown in FIG. 17, a microprocessor system 1c comprises a first function block 71 including a waveform recorder 73 and a D/A converter 74 and a second function block 72 including a waveform recorder 77 and an A/D converter 78. A speaker unit 81 is connected to the first function block 71 and a microphone 82 is connected to the second function block 72. The waveform generator 73 includes a memory control circuit 75 and an address generation circuit 76. The waveform recorder 77 includes a memory control circuit 79 and an address generation circuit 80. A sound can be reproduced from the speaker unit 81 by storing digital sound data in the memory control circuit 75 of the waveform generator 73. Further, an analog signal from a microphone 82 is converted to digital sound data by the A/D converter 78 and the digital sound data is stored in the memory control circuit 79 of the waveform recorder 77. The present invention may be applied to a system in which only either of the first and second function blocks 71, 72 is installed. Further, the present invention may be applied to a system in which the function blocks 13, 14, 61, 71 and 72 are appropriately combined and installed.

e) The end value supplied to the comparator 36 may be changed. For example, when drive data is read from the memory 31, the end address of the drive data may be set as the end value.

f) The number of drive data pieces (end addresses) read from the memory 31 may be fixed. In this case, the comparator 36 may be replaced by an AND circuit. For example, if the end value is fixed to "FFH", an 8-input AND circuit can be used. If the end value is set to an optional fixed value, a comparator may comprises an AND circuit having input terminals which corresponds to the number of bits of the end value and an inverter circuit connected to the input terminals of the AND circuit.

g) The rotation direction of the stepping motor 2 may be changed by changing the phase relationship of drive data instead of switching the count directions of the address generation circuits 24, 28. That is, if the phase of the drive data stored in the memory control circuit 23 advances 90 degrees from the phase of the drive data stored in the memory control circuit 27, the rotation direction of the stepping motor 2 can be changed by delaying the phase by 90 degrees. In this case, whenever the rotation direction of the stepping motor 2 is changed, the CPU 11 needs to rewrite the drive data stored in at least one of the memory control circuits 23, 27. However, the address generation circuits 24, 28 may perform the increment operation or the decrement operation. Accordingly, the switching circuits 431, 432, . . . , and the flip-flops 441, 442, . . . are omitted and the size of the function blocks 13, 14 is reduced by reducing the number of elements of the function blocks 13, 14.

h) The present invention may be applied to a system provided with a function block having a plurality of functions.

Therefore, the present examples and embodiments are to be considered as illustrative and not restrictive and the invention is not to be limited to the details given herein, but may be modified within the scope and equivalence of the appended claims.

What is claimed is:

1. A data input/output (I/O) system connected to an address bus and a data bus, comprising:
   a first register that stores data from the data bus in response to an access signal supplied from the address bus, wherein the data is transferred from the first register to a memory as an address signal; and
   a second register that stores data generated by the memory in response to the data from the first register.

2. The data I/O system of claim 1, further comprising an address generation circuit that generates an address signal accessible by the memory and supplies the address signal to one of the memory and the first register.

3. The data I/O system of claim 2, wherein the address generation circuit includes:
   a counter that counts clock signal pulses and generates the address signal, which corresponds to the count value;
   a control register that stores an end address of the data stored in the memory; and
   a comparator connected to the counter and the control register to compare the end address and the address signal and supply a signal for resetting the count value of the counter when the end address and the address signal match.

4. The data I/O system of claim 3, wherein the counter is an up-and-down counter that performs one of an incremental count operation and a decremental count operation in response to a switching signal, and the up-and-down counter resets the count value in response to a clear signal in the incremental count operation and sets the end address to the initial value in the decremental count operation when the count value has underflowed.

5. The data I/O system of claim 1, further comprising a digital-to-analog (D/A) converter that receives data from the second register and converts the data to an analog signal.

6. The data I/O system of claim 5, wherein the address generation circuit generates a circulating address signal, and the D/A converter generates an analog signal having a periodic waveform by repetitively receiving data from the second register.

7. The data I/O system of claim 1, further comprising:
   a decoder connected to the address bus to generate a control signal in response to the access signal; and
   a switch circuit connected between the memory and the data bus and being conductive in response to the control signal.

8. A data I/O system, comprising:
   an analog-to-digital (AND) converter that converts an analog signal to a digital signal;
   a memory connected to the A/D converter that stores the digital signal;
   a first register connected to the memory that stores an address signal; and
   an address generation circuit connected to the first register and including a control register that receives control data from a processing unit, wherein the address generation circuit generates the address signal and supplies the address signal to the first register.

9. A data I/O system, comprising:
   a first function block including,
   a first register that stores a first address signal,
   a first memory that receives the first address signal stored in the first register and inputs and outputs data in accordance with the first address signal,
   a first address generation circuit that generates the first address signal successively and supplies the first address signal to the first register, and
   a digital-to-analog (D/A) converter that receives data from the first memory and converts the data to an analog signal;
   a second function block connected to the first function block, including,
   an analog-to-digital (A/D) converter that converts the analog signal to a digital signal,
   a second memory that stores the digital signal,
   a second register connected to the second memory that stores a second address signal, and
   a second address generation circuit connected to the second register that generates the second address signal successively and supplies the second address signal to the second register; and
   a processor that receives the digital signal from the second memory, corrects the data stored in the first memory, and supplies the corrected data to the first memory.

10. A method for inputting and outputting data, comprising the steps of:
    storing data from an address bus in a first register in response to an access signal supplied from the address bus;
    transferring the data from the first register to a memory as an address signal; and
    storing data generated by the memory in a second resister in response to the data from the first register.

11. A data input/out (I/O) system connected to an address bus and a data bus, comprising:
    a first register that stores data from the data bus in response to an access signal supplied from the address bus;
    a memory that receives the data stored in the first register and inputs and outputs memory data from and to the data bus using the data as an address signal; and
    a second register that stores data generated by the memory in response to the data from the first register.

12. A microprocessor comprising:
    a central processing unit (CPU) connected to an address bus and a data bus;
    a first register that stores data from the data bus in response to an access signal supplied from the address bus;
    a memory that receives the data from the first register as an address signal to access memory cells therein and inputs and outputs memory data from and to the data bus; and
    a second register that stores data generated by the memory in response to the data from the first register.

13. A microprocessor connected to a memory comprising:
    a central processing unit (CPU) connected to an address bus and a data bus, in which the central processing unit generates control data;
    an address generation circuit that generates a sequence of addresses in response to the control data from the CPU; and
    a memory control circuit that accesses the memory in accordance with the sequence of addresses from the address generating circuit; and
    a register that stores data generated by the memory in response to the data from the address generating circuit, wherein the control data indicates start and stop of the address generation circuit.

14. A microprocessor comprising:

a CPU connected to an address bus and a data bus;

a first register that stores data from the data bus in response to an access signal supplied from the address bus, wherein the data is transferred from the first register to a memory as an address signal; and a second register that stores data generated by the memory in response to the data from the first register.

* * * * *